US006661883B1

United States Patent
Dowser et al.

(10) Patent No.: US 6,661,883 B1
(45) Date of Patent: Dec. 9, 2003

(54) METHOD AND APPARATUS ALLOWING REMOTE KEY SYSTEM UNITS TO INTEROPERATE

(75) Inventors: Michael T. Dowser, Greely (CA); Robert P. Macaulay, Gloucester (CA); Brian B. Egan, Stittsville (CA); Frank F. Meijer, Ottawa (CA); Christopher R. Solar, Ottawa (CA); Daniel D. Thibault, Carleton Place (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/337,640

(22) Filed: Jun. 22, 1999

(30) Foreign Application Priority Data

Jun. 11, 1999 (CA) ............................................. 2274205

(51) Int. Cl.[7] ................................................ H04M 1/00
(52) U.S. Cl. ........................ 379/156; 379/165; 379/164
(58) Field of Search ................................ 379/156–166, 379/177–179, 268–269, 265.01–265.02

(56) References Cited

U.S. PATENT DOCUMENTS 4,572,928 A  2/1986  Nishimura et al.

FOREIGN PATENT DOCUMENTS

| EP | 0 534 783 A2 |   | 3/1993 |
| EP | 0 602 856 A2 |   | 6/1994 |
| EP | 0 649 241    | * | 4/1995 |
| EP | 0 649 241 A1 |   | 4/1995 |

OTHER PUBLICATIONS

International Search Report of PCT/CA00/00702.
International Preliminary Examination Report of PCT/CA00/00702.
Written Opinion of PCT/CA00/00702.

* cited by examiner

*Primary Examiner*—Duc Nguyen
(74) *Attorney, Agent, or Firm*—Kevin L. Smith

(57) ABSTRACT

The invention provides a key system unit comprising a first interface suitable for connection to a plurality of local terminals and a control unit coupled to the first interface. The control unit is operative for receiving a user data signal from the first interface and routing the user data signal toward a selected destination. The control unit has a registry for storing status information, the status information including a local segment and at least one remote segment, the local segment providing a representation of the functional status of the key system unit, the remote segment providing a representation of the functional status of a remote key system unit. The information in the registry can be displayed on a display screen on a local terminal to provide the user with system status information on the local key system unit and the remote key system unit.

27 Claims, 2 Drawing Sheets

METHOD AND APPARATUS ALLOWING REMOTE KEY SYSTEM UNITS TO INTEROPERATE

FIELD OF THE INVENTION

This invention relates to communication networks. It is particularly applicable to telephone communication networks such key system units operating in a networking environment. The invention also extends to a routing agent, that can allow remote key system units to interoperate with one another.

BACKGROUND OF THE INVENTION

Key telephone system units, such as the product developed and commercialized under the trademark Nortstar by the present assignee are standalone units offering a range of enhanced functions to the terminals physically connected to the unit. Naturally, such units permit a call to extend beyond the physical boundaries of a unit, however such external call can only be provided with limited functions and services. This is a disadvantage to organizations having offices in remote geographical areas, where each office is serviced by an independent key system unit. Users from one office can establish calls to users to other offices, such as through the PSTN (Public Switched Telephone Network), however those external calls offer the user only the functions supported by the PSTN, and the enhanced services available to internal calls are not accessible.

Therefore, there is a need in the industry to improve the interoperability of key system units such as to allow a broader range of interactions between remote key system units than is presently available.

SUMMARY OF THE INVENTION

According to one aspect, the invention provides a key system unit comprising a first interface suitable for connection to a plurality of local terminals and a control unit coupled to this first interface. The control unit is operative to receive a user data signal from the first interface and to route the user data signal toward a selected destination. In one example, the selected destination could be another local terminal (internal connection). In another example, the selected destination is outside the boundaries of the key system unit (external connection).

The user data signal could be an audio signal, but could also be a video signal or any other signal having user content.

The control unit comprises a registry for storing system status information, the system status information including a local segment and at least one remote segment. The local segment of the registry provides a representation of the functional status of the key system unit while the remote segment provides a representation of the functional status of a remote key system unit. The key system unit further comprises a second interface coupled to the control unit for allowing the control unit to exchange signaling information that conveys status information with an external entity such as for example the remote key system unit.

Preferably, the control unit includes a switching fabric operative for receiving a user data signal from the first interface and routing the user data signal toward a selected destination.

According to a specific implementation, the key system unit is a key telephone system.

In a specific example, the system status information reflects the condition at any particular time of one or more components of the key system unit, such as terminals and lines connected to the key system unit or a remote key system unit. For instance, the system status of a terminal information may indicate information items selected from the set consisting of busy/free status, do not disturb status, name of party associated to the local terminal, last number dialed, user preferences, audio level and call history. Under this example, the local segment of the registry reflects the free/busy status of the local terminals while the remote segment reflects the information items of on or more of the terminals connected to the remote key system unit. In another example of the system status of a line may indicate information items selected in the group consisting of name of the calling party when an external call is received, maintenance test signals, all trunks busy, equipment failure, routing information, flow control.

Under a specific example of implementation of the present invention, the control unit is capable of transmitting to at least one of the local terminals connected to the first interface at least a portion of the information residing in the local segment and in the remote segment of the registry for processing by the at least one of the local terminals. That information can then be displayed to the user. In a specific example where the information items in the status information reflect the busy/free status of the terminals, a user at a terminal physically connected to the key system unit can see whether a terminal physically connected to the remote key system unit is free or is busy. By expanding the scope of the system status information to include additional elements, the two key system units can be made to appear to a user as a single unit, although in reality each key system unit has its own controlling entity.

According to a specific implementation, the system status information also provides a representation of parameters of a call involving a terminal connected to the key system unit. The system status information also provides a representation of parameters of a call involving a terminal connected to a remote key system unit. Specific example of parameters include the name of the calling party, whether call is on hold, whether the call is transferred from another terminal and the duration of the call.

According to another broad aspect, the invention provides a method for enhancing the interoperability between a first and a second key system units. The method comprises storing status information in a registry of the first system unit, the status information including a local segment and at least one remote segment. The local segment provides a representation of the functional status of a first key system unit while the remote segment provides a representation of the functional status of the second key system unit. The method also comprises displaying at least a portion of the information in the remote segment on a display of a terminal connected to the first key system unit.

According to another aspect, the invention provides a routing agent for allowing a first key system unit to interoperate with a remote key system unit. The routing agent comprises a first port through which control information with the first key system unit can be exchanged and a second port suitable for connection to a signaling bridge through which signaling information with an external entity, such as for example a remote key system unit can be exchanged. A processing unit manages the operation of the routing agent.

The processing unit receives control information conveying system status information at the first port for transmitting signaling information through the second port, the signaling information being indicative of the status of the first key system unit.

In a specific example, the processing unit in the routing agent is responsive to signaling information received at the second port and indicative of system status information associated with a remote key system unit for issuing control information at said first port to cause the status information associated with the remote key system unit to be imported in a registry of the first key system.

In a more specific example of implementation, the routing agent establishes a functional dialogue with a routing agent associated with a remote key system unit to allow a call to be established between the two key system units. Each routing agent controls the local key system unit to set up a media bridge between them to carry the user data.

In a specific example, a first key system includes a switch fabric operative for receiving a user data signal from a terminal local to the first key system unit and routing the user data signal toward a selected destination. A second key system unit includes a switch fabric operative for receiving a user data signal from a terminal local to the second key system unit and routing the user data signal toward a selected destination. The first key system unit and the second key system unit are connected to one another by a media bridge. The routing agent associated to the first key system is operative for exchanging control information with the first key system unit to cause the switch fabric of the fist key system unit to set a certain connection path there through. The routing agent is further operative for exchanging signaling information with the external entity to cause the switch fabric of the second key system unit to set a certain connection path there through. The connection paths in the switch fabric of the fist key system unit and the connection path in the switch fabric of the second key system unit are linked to one another by the media bridge. The media bridge allows user data input to the first key system unit through a terminal local to the first key system unit to be transported to a terminal local to the second key system unit through the connection path set in the switch fabric of the second key system unit, the media bridge and the connection path set in the switch fabric of the second key system unit.

Other aspects and features of the present invention will become apparent to those ordinarily skilled in the art upon review of the following description of specific embodiments of the invention in conjunction with the accompanying figures.

DETAILED DESCRIPTION

Figure 1:
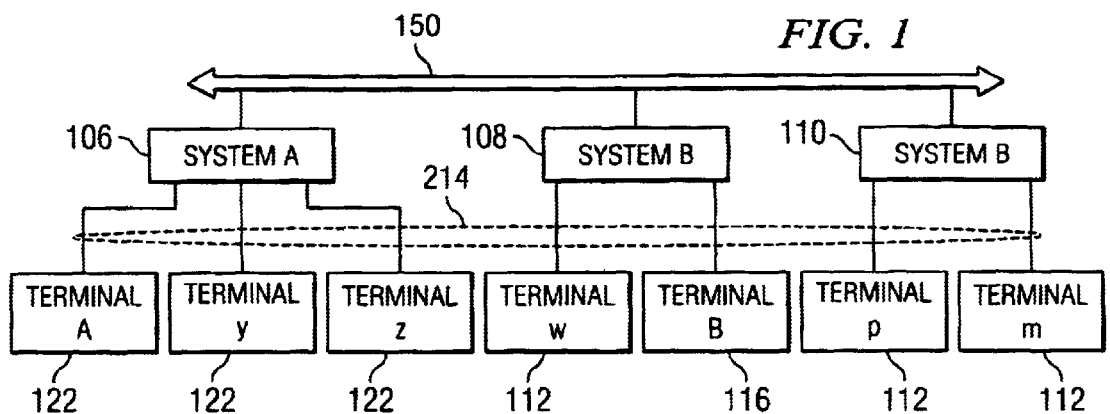
FIG. 1 is a block diagram of a communication network comprising a plurality of key system units coupled to one another in a network arrangement.

FIG. 1 of the drawings illustrates a communication network comprising a plurality of key system units 106 108 110 physically distinct from one another. Typically, the key system units are remote from one another, namely one key system unit can be located in one city while another key system unit is located in another city. Each key system unit services local terminals 122 112 116. In a specific example the local terminals are telephone sets with a display allowing the user to receive and visualize system status information. For example, the product developed and commercialized under the trademark Nortstar may incorporate display capabilities that allow the system status information to be visualized by a user of the key system unit.

The key system units 106 108 110 communicate with one another through a communication medium 150. For simplicity, the communication medium has been shown in FIG. 1 by a single continuous line. This does not necessarily imply that the communication medium 150 is a single channel. The communication medium 150 may comprise separate channels, for instance one channel to convey signaling information, referred to as signaling bridge, and one channel to transport user data, referred to as media bridge. The channels may be cables, optical fibers, or wireless connections, dedicated modem connection over the PSTN among others. The transport protocols used on the communication medium 150 may vary and is a design issue. In a preferred embodiment, TCP/IP is used to carry signaling information on the communication medium 150. Other protocols may be used on the communication medium without detracting from the spirit of the invention.

The terminals 122 112 116 are connected to their respective key system units via links 214. The terminals 122 112 116 are not, strictly speaking, part of the key system units. The links 214 provide a medium allowing an exchange of electronic signals between the terminals 122 112 116 and their respective key system units 106 108 110 where the electronic information may be control signals or user data. The links 214 may be cables, optical fibers, or wireless connections among others.

Figure 2:
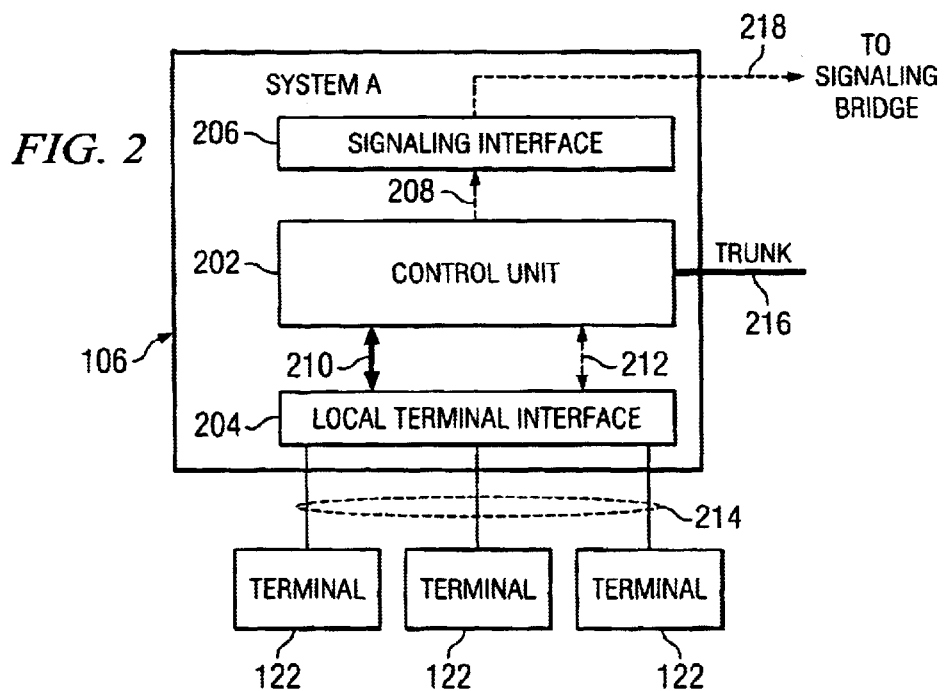
FIG. 2 is a detailed block diagram of a single key system unit depicted in FIG. 1; the other key system units shown in FIG. 1 have an identical structure.

FIG. 2 illustrates in greater detail the key system unit 106 in accordance with the spirit of the invention. The key system units 108 and 110 are identical to the key system unit 106. In a specific example, the key system unit 106 comprises a first interface 204, herein designated as the local terminal interface, suitable for connection to a set of local terminals 122; a control unit 202 coupled to the local terminal interface 204, and a second interface 206, herein referred to as the signaling interface 206.

The local terminal interface 204 receives user data and control signals from the terminals 122 and transfers it to/from control unit 202. For clarity, FIG. 2 illustrates a control channel 212 to convey control signals between the interface 204 and the control unit 202 and a data channel 210 to convey user data between the interface 204 and the control unit 202. In a practical implementation, the control and the data channels 212 and 210 may be embodied over a single physical link. The control and the data channels 212 and 210 are bi-directional, allowing signaling information and user data to travel from the terminals 122 to the control unit 202 and vice-versa.

The control unit 202 has a port for connection to the data channel 210 and a port for connection to the control channel 212. The control unit 202 has also a port for exchanging control information with the signaling interface 206 and a port for exchanging user data with the external world (such as the PSTN) through a trunk 216. In a specific example, the trunk 216 is the PSTN. In another example, the trunk 216 is a dedicated private network communication medium.

The main function of the control unit 202 is to manage, in general, the operation of the key system unit 106. An important aspect of this controlling function is to establish calls. For instance, the control unit 202 is operative to route calls, such as between terminals 122 associated to the same key system unit 106(allowing establishment of internal calls) or calls between a terminal 122 and an external destination (allowing establishment of external calls).

Figure 3:
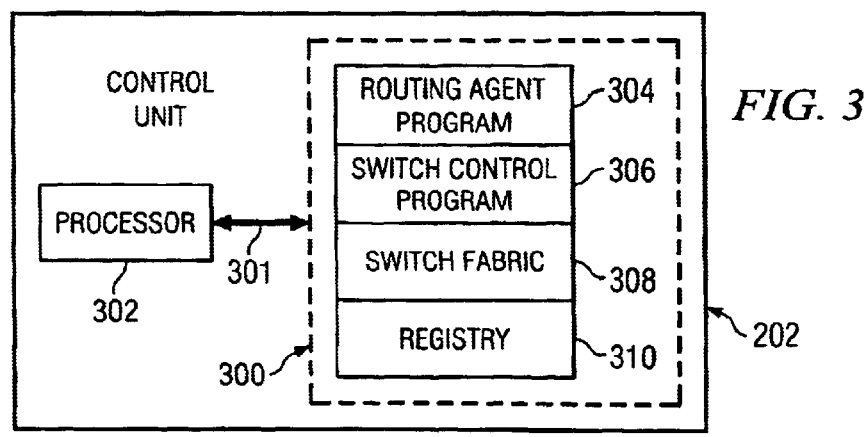
FIG. 3 is a block diagram of the control unit of the key system unit depicted in FIG. 2.

A specific example of implementation of the control unit 202 is shown in FIG. 3 and comprises a processor 302 (CPU) and a memory or computer readable medium 300 connected to the processor by a data communication bus 301. The CPU 302 interacts with interfaces 204 206 to receive and/or output data/control information. The memory 300 stores data implementing a switch fabric 308, a system status registry 310 and the instructions of program elements implementing the functionality of a switch control unit 306 and a routing agent 304 when run on the processor 302.

The switch fabric 308 is concerned with directing the user data received from a terminal 122 to an output point where the data can continue toward its intended destination. The switch control unit 306 interacts with the switch fabric 308 to selectively set in the switch fabric 308 a connection path allowing a communication link to be established between a terminal connected to the key system unit 106 and a destination terminal.

The system status registry 310 stores status information. The status information includes a local segment and at least one remote segment. The status information in the local segment provides a representation of the functional status of the key system unit 106. The remote segment provides a representation of the functional status of a remote key system unit, such as the key system units 108 and 110. Advantageously, in the network configuration shown in FIG. 1, the registry 310 will be provided with two remote segments, one segment storing status information on the key system unit 108 and one remote segment storing status information regarding the key system unit 110.

In a specific example of implementation, the registry 310 can be conceptually described as a table, there being an entry for each terminal 122 112 116 in this table. The entry has a plurality of fields related to the status of the corresponding terminal. Specific examples of the status information regarding the functional status of the terminal include busy/free status, do not disturb status, name of party associated to the terminal, last number dialed, user preferences (such as type or ring tone preferred, audio level or ring level etc.) and call history among others. The table also includes entries related to parameters of a call involving a given terminal. Specific examples of status information regarding parameters of a call with which a terminal is involved include name of the calling party, whether call is on hold, whether the call is transferred from another terminal and duration of the call etc. In addition the table includes entries on the status of the lines (trunks) connecting the key system unit with an external network, such that the PSTN. The line entries hold parameters for each external line, such as name of the calling party when an external call is received, maintenance test signals, all trunks busy, equipment failure, routing information, flow control or any other information that can originate from the PSTN regarding the status of a call.

The local segment of the registry provides the status information on the terminals 122, calls and external lines associated with the terminals local to the key system unit 106, while the remote segments of the registry provides the status information on the terminals, calls and external lines associated with the key system units 108 and 110.

The switch control program 306 interacts with the local segment of the registry to update status information related to the terminals 122 and calls involving the terminals 122 that are local to the key system unit 106. This function is implemented in prior art key system units, such as the Nortstar key system commercialized by the present assignee. It is therefore not necessary here to describe in detail how the updating of the registry as far as the local terminals 122 is performed since a person skilled in the art possesses this knowledge. Suffice it to say that the switch control program 306 exchanges control signals with the other entities of the key system unit 106 in order to manage its operation. The Nortstar key system unit commercialized by the present assignee uses an internal protocol known as the FUMP protocol. This protocol can also be used for the present invention. It should be noted that the specific type of protocol is not critical for the success of the invention and protocols other than the FUMP protocol can be used without detracting from the spirit of the invention.

A sub-element of the control program 306 whose responsibility is to maintain the local segment of the registry 310 up to date observes this exchange of control signals and creates entries, alters entries or deletes entries in the registry 310 such that at any given time the registry 310 reflects the functional status of the key system unit 106.

The routing agent 304 is responsible for transmitting to other key system units (108 and 110) or to a central network management entity signaling information to convey to the remote key system units or to the central management entity the system status information residing in the local segment of the registry 310. The routing agent 304 can be implemented in software that is executed by the processor 302. The routing agent 304 continuously monitors the actions taken by the switch control program 306, translates the activity into a functional protocol selected for the exchange of signaling information over the signaling bridge and then sends messages that reflect the operation of the switch control program 306. Note that such translation is not required when the communication protocol internal to the key system unit 106 is the same as the protocol used on the signaling bridge.

The routing agent 304 thus allows the other key system units 108 and 110 or a central network management entity to follow the activity of the key system unit 106. In other words, the routing agent 304 allows exposing the internal communication message stream to external entities, such that they can acquire knowledge regarding the system status of the key system unit 106. The routing agent 304 can filter the internal activities of the key system unit 106. In other words, not every internal message, event or command needs to be echoed outside the key system unit 106 by the routing agent 304. There may very well be some messages or commands that are not useful or desired externally, in the particular context in which the invention is implemented. It is therefore in the scope of the invention to provide a level of filtering in the routing agent 304 such that only the selected messages and commands are exposed.

Another function of the routing agent 304 is to allow the remote segment of the registry 310 to be updated following the reception of signaling information observed over the signaling bridge and sent by a remote key system unit 108 110 or from a centralized network management entity. The routing agent 304 observes the stream of signaling information present on the signaling bridge and analyzes each message. Filtering may be applied to reject messages of a type that has been previously identified as being of no interest. When a message of interest is observed, such as a message conveying a system status information of a remote key system unit, the routing agent 304 will translate the message from the protocol used over the signaling bridge (if necessary) into the protocol used internally in the key system unit 106 and direct the message to the switch control program 306 such that the latter can use it to update the remote segment of the registry 301.

The two previously described functions of the routing agent 304 relate to the exchange of signaling information with remote key system units or with a centralized network management entity allowing to maintain in each key system unit the remote segment of the registry up to date. In a specific example, the functionality of the routing agent is expanded to enable calls to be exchanged between remote key system units in an enhanced fashion. Under this example, the routing agent 304 is operative to process the signaling information observed on the signaling bridge to determine if a call spans the boundary of the key system with which the routing unit is associated. For instance, when the routing agent 304 identifies a message or functional command over the signaling bridge indicative of an incoming call from a remote key system unit, say the key system unit 108 and directed to the key system unit 106, it is operative to issue control signals to the switch control program 306 to cause the latter to set a connection path in the switch fabric 308 such that user data from the key system unit 108 can be delivered to the proper terminal 122.

More specifically, the routing agent 304 of the key system unit 106 will negotiate with the routing agent of the key system unit 108 the parameters of the call to be established between the two key system units. A specific example of a protocol that allows such negotiation and that can be used for exchanging the signaling information over the signaling bridge is the H.323 protocol. The H.323 protocol is actually a set of protocols that define how two entities can negotiate the establishment of an audio, data or video connection between them. The H.323 protocol is a standard and the reader is invited to refer to the relevant standards documentation for details. It should also be noted that the H.323 protocol could also be used for the intra-key system unit 106 signaling as well. Once the particulars of the call have been established, the routing agent 304 of the key system unit 106 issues control signals to the switch control program 306 directing the latter to establish through the switch fabric 308 a connection path from a media bridge or inter-key system unit channel to the proper terminal 214. Another specific example of a protocol that can be used to establish a call is a call initiation protocol such as a handshake call initiation protocol.

The media bridge is a link between the key system units 106 and 108 allowing user data to be exchanged. In one possible implementation, the media bridge may be established by a simple data carrier medium such as an electric signal carrier cable, an optic fiber or a wireless connection. In a specific example, the media bridge is through the PSTN, set over a line or trunk 216. The media bride may be physically separate from the signaling bridge or both bridges may be implemented over the same transmission medium.

Figure 4:
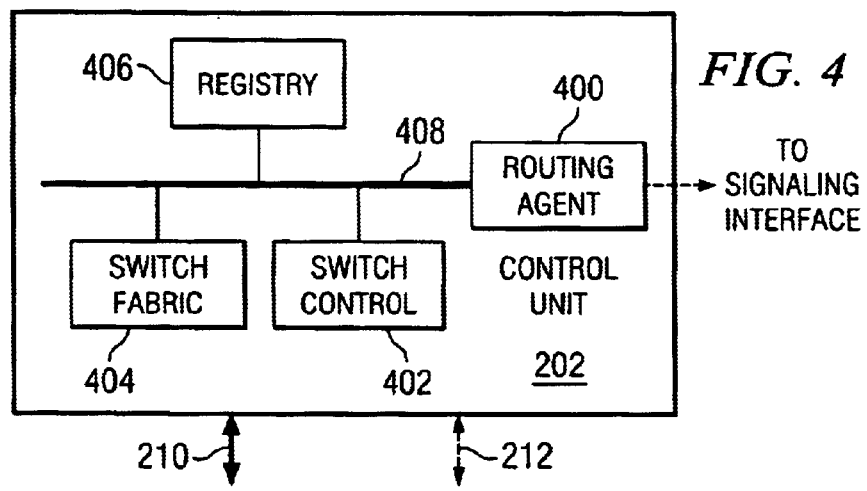
FIG. 4 is a functional block diagram of a control unit in accordance with an alternative embodiment of the invention.

In the example of implementation described above, the routing agent 304 was implemented in software. This is not the only possibility. An alternative embodiment of the control unit 106 is shown in FIG. 4. As shown, the control unit 202 comprises a routing agent 400, a switch control 402, a switch fabric 404 and a registry 406. All these components are implemented as hardware units in the form of separate components communicating with one another over a communication link 408. The switch fabric 404 and the registry 406 include memory units similar to those described in connection with FIG. 3. As a variant, the registry 406 may comprise a dedicated processor unit and a memory portion, the dedicated processor allowing to modify the entries in the memory port-on of the registry 406 in response to a control signals received from the routing agent 400 and optionally from the switch control 402. The routing agent 400 and the switch control 402 have dedicated processors implementing the functionality described above. Under this form of implementation, the routing agent 400 includes two ports, one for connection to the key system unit 106, in particular the switch control 402 for exchanging control signals with the switch control 402, and one port for connection to the signaling bridge.

Other possibilities of implementation of the routing agent also exist. The routing agent can be an entity external to the key system unit 106. In this form of implementation, the routing agent needs to connect to a source of internal signals such that it can expose externally the messages and events that occur internally of the key system unit 106. Commercially available key system units, such as the Nortstar key system unit commercialized by the present assignee are designed such that each terminal 122 112 116 receives the messages, commands and events issued, processed or observed by the control unit 202. By adopting the same architecture for the key system unit 106, it thus suffices to connect the routing agent to a port normally reserved to a terminal and as such all the data the routing agent needs to extract and introduce in the key system unit 106 is easily available. Under this form of construction, the routing agent is constructed in a similar manner to the variant depicted in FIG. 4. More particularly, the routing agent is an entity that performs its function independently and possesses its own dedicated processor.

Figure 5:
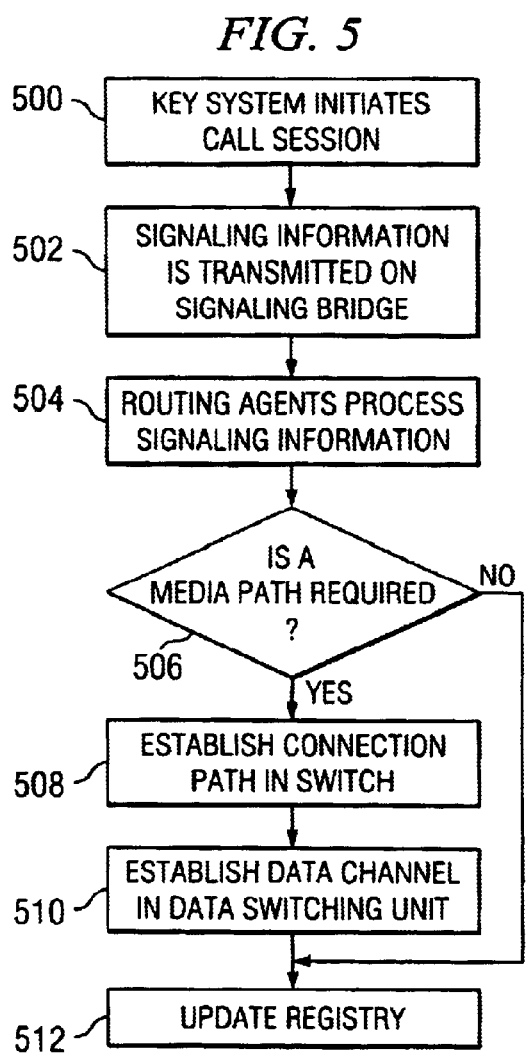
FIG. 5 is a flow chart illustrating the operation of the key system unit of FIG. 2.

A specific example of the operation of the network of FIG. 1 will now be described in conjunction with the flow chart of FIG. 5. A first terminal initiates a connection 500 with a second terminal by sending control signals to the its local key system unit. The control signals may include a signal identifying the destination of the communication, a signal identifying certain functionality associated with the connection or other suitable signaling elements. In a specific example, the control signals include an electronic representation of the digits of the telephone number of the second terminal. The local terminal interface 204 receives the control signals and dispatches them to the control unit 202. At step 502, the local routing agent, that observes this exchange of signals, transmits over the signaling bridge the signaling information observed during this internal call setup. At step 504 the routing agents of the remote key system units connected to the signaling bridge process the signaling information and apply the test defined in step 506. If the connection attempt is for a local call (within the boundaries of the key system unit in which the call has originated), condition 506 is answered in the negative. The remote routing agents then issue control signals to their keys system units to update the remote segments of their registries. In this case the updated information includes the busy/free status of the terminal that has initiated the call. More specifically the status of the terminal that has initiated the internal call is set to busy.

The switch control program 306 of the local key system unit determines by examining the control signals that a request for establishing an internal communication link is being formulated. In response to this observation the switch control program 306 exchanges control information with the switch fabric 308 to set a connection path between the calling party and the called party, both at local terminals 122.

The above example illustrates a situation involving a local call. Now, if the connection defined by the signaling information extends beyond the physical boundaries of the key system with which the routing agent is associated (the terminal is attempting to make a call with a remote key system unit), condition 506 is answered in the positive and the system proceeds to step 508. The routing agent associated with the destination key system unit upon processing of the signaling information over the signaling bridge recognizes that another key system unit whishes to establish a call with it. The routing agent of the remote key system unit will then start negotiating over the signaling bridge with the key system unit that originated the call to set-up the call between them. As mentioned earlier routing agent to routing agent negotiation can be made by using the H.323 protocol. When the negotiation is completed, each routing agent causes a suitable connection path to be created in the switch fabric of the respective key system unit. To create the connection path each routing agent communicates with its respective switch control unit. The media bridge is the inter-switch fabric connection that transports the user data from one key system unit to the other key system unit. The media bridge may be set-up directly by the routing agents or the routing agents may direct the respective switch control units to perform this connection. For instance, if the media bridge is through the PSTN, the routing agent of the key system with which the call originates may simply transmit to the associated switch control unit the telephone number to dial in order to complete the user data connection.

The network arrangement illustrated in FIG. 1 is a peer-to-peer system where the key system units communicate with one another for the purpose of updating their internal registries and also for call establishment. In a possible variant, a centralized network management entity can be used to assist those functions. For instance this centralized management entity, which could take the form of a server in the network, communicates with each node independently such that the node uploads its local registry segment into a central database. This database forms a repository accessible by all the key system units in the network. Following this, the server downloads to each key system unit, either regularly or upon demand from the key system unit, the local registries of the remote key system units in the network. This allows each key system unit to maintain an up to date remote segment registry without actually communicating with a remote key system unit. The same architecture can also be used for calls between physically separate key system units. Here, the originator of the call communicates with the server to signal its intention to set up a call with a remote key system unit. The server will then communicate with the remote key system unit and perform negotiation such that the media bridge and the internal switch fabric setting can be performed allowing the call to take place. This negotiation can also be made by using the H.323 protocol.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

What is claimed is:

1. A key system unit comprising:
   a first interface suitable for connection to a plurality of local terminals;
   a control unit coupled to said first interface, said control unit being operative for receiving a user data signal from said first interface and routing the user data signal toward a selected destination, said control unit comprising a registry for storing status information, said status information including a local segment and at least one remote segment, the local segment providing a representation of the functional status of said key system unit, the remote segment providing a representation of the functional status of a remote key system unit;
   a second interface coupled to said control unit for allowing said control unit to exchange signaling information with an external entity, said signaling information conveying status information.

2. The key system unit as defined in claim 1, wherein said control unit includes a switching fabric operative for receiving a user data signal from said first interface and routing the user data signal toward a selected destination.

3. The key system unit as defined in claim 2, wherein said remote segment provides a presentation of the functional status of at least one terminal connected to the remote key system unit.

4. The key system as defined in claim 3, wherein the functional status of at lest one terminal connected to the remote key system unit includes information items selected in the group consisting of busy/free status, do not disturb status, name of party associated to the terminal, last number dialed, user preferences, audio level and call history.

5. The key system as defined in claim 4, wherein said remote segment provides a representation of parameters of a call involving a terminal connected to the remote key system unit.

6. The key system as defined in claim 5, wherein the parameters of a call involving a terminal connected to the remote key system unit are selected in the group consisting of name of the calling party, whether call is on hold, whether the call is transferred from another terminal and duration of the call.

7. The key system unit as defined in claim 2, wherein said remote segment provides a representation a status of a line connecting the remote key system unit with an external network.

8. The key system as defined in claim 7, wherein the status of a line connecting the remote key system unit with an external network includes information items selected in the group consisting of name of the calling party when an external call is received, maintenance test signals, all trunks busy, equipment failure, routing information, flow control.

9. The key system as defined in claim 2, wherein said local segment provides a representation of the functional status of at least one local terminal connected to the key system unit.

10. The key system as defined in claim 9, wherein the functional status of at least one local terminal connected to said key system unit includes information items selected in the group consisting of busy/free status, do not disturb status, name of party associated to the local terminal, last number dialed, user preferences, audio level and call history.

11. The key system as defined in claim 10, wherein said local segment provides a representation of parameters of a call involving a local terminal connected to said key system unit.

12. The key system as defined in claim 11, wherein the parameters of a call involving a local terminal connected to said key system unit are selected in the group consisting of name of the calling party, whether call is on hold, whether the call is transferred from another terminal and duration of the call.

13. The key system as defined in claim 12, wherein said local segment provides a representation a status of a line connecting said key system unit with an external network.

14. The key system as defined in claim 13, wherein the status of a line connecting said key system unit with an external network includes information items selected in the group consisting of name of the calling party when an external call is received, maintenance test signals, all trunks busy, equipment failure, routing information, flow control.

15. The key system unit as defined in claim 2, wherein said control unit is capable of transmitting to at least one of the plurality of local terminals connected to said first interface at least a portion of said remote segment for processing by the at least one of the plurality of local terminals.

16. The key system unit as defined in claim 15, wherein the processing by the at least one of the plurality of local terminals of the portion of said remote segment includes displaying the portion of said remote segment on a display unit.

17. The key system unit as defined in claim 2, wherein the key system is a key telephone system.

18. The key system as defined in claim 2, wherein said key system unit and said remote key system unit are geographically separated.

19. The key system as defined in claim 2, wherein the user data signal is an audio signal.

20. The key system as defined in claim 2, wherein the user data signal is a video signal.

21. A network comprising:
   a communication medium suitable for carrying signaling information and data;
   a plurality of key system units as defined in claim 2, the second interface of each key system unit being connected to said communication medium, said communication medium allowing a certain key system unit of said plurality of key systems to exchange signaling information with another key system unit of said plurality of key system units.

22. A method of enhancing the interoperability between a first and a second key system units, said method comprising:
   storing status information in a registry of the first system unit, said status information including a local segment and at least one remote segment, the local segment providing a representation of the functional status of a first key system unit, the remote segment providing a representation of the functional status of the second key system unit;
   displaying at least a portion of the information in said remote segment on a display of a terminal connected to the first key system unit.

23. The method as defined in claim 21, comprising the step of displaying at least a portion of the information in said local segment on a display of a terminal connected to the second key system unit.

24. The method as defined in claim 22, wherein the first and the second key system units are telephone key system units.

25. A routing agent for allowing a first key system unit to inter-operate with a second key system unit, said routing agent comprising:
   a first port for exchanging control information with the first key system unit;
   a second port suitable for connection to a signaling bridge for exchanging signaling information with an external entity;
   a processing unit for receiving control information at said first port for transmitting on the signaling bridge signaling information indicative of the status of the first key system unit, wherein said processing unit is responsive to signaling information received at said second port indicative of status information associated with the remote key system unit, to issue at said first port control information operative to cause the status information associated with the second key system unit to be imported in a registry of the first key system unit.

26. A routing agent for allowing a first key system unit to inter-operate with a second key system unit, said routing agent comprising:
   a first port for exchanging control information with the first key system unit;
   a second port suitable for connection to a signaling bridge for exchanging signaling information with an external entity;
   a processing unit for receiving control information at said first port for transmitting on the signaling bridge signaling information indicative of the status of the first key system unit, wherein the first key system includes a switch fabric operative for receiving a user data signal from a terminal local to the first key system unit and routing the user data signal toward a selected destination, the second key system unit includes a switch fabric operative for receiving a user data signal from a terminal local to the second key system unit and routing the user data signal toward a selected destination, the first key system unit and the second key system unit being connected to one another by a media bridge, said routing agent being operative for:
   a) exchanging control information with the first key system unit to cause the switch fabric of the first key system unit to set a certain connection path therethrough;
   b) exchanging signaling information with the external entity to cause the switch fabric of the second key system unit to set a certain connection path therethrough, the connection paths being linked to one another by the media bridge;
   wherein user data input to the first key system unit through a terminal local to the first key system unit can be transported to a terminal local to the second key system unit through the connection path set in the switch fabric of the second key system unit, the media bridge and the connection path set in the switch fabric of the second key system unit.

27. A key system unit comprising;
   a first interface means suitable for connection to a plurality of local terminals;
   a processing means coupled to said first interface means, said processing means being operative for receiving a user data signal from said first interface and routing the user data signal toward a selected destination, said processing means comprising a memory means for storing status information, said status information including a local segment and at least one remote segment, the local segment providing a representation of the functional status of said key system unit, the remote segment providing a representation of the functional status of a remote key system unit;
   a second interface means coupled to said processing means for allowing said processing means to exchange signaling information with an external entity, said signaling information conveying status information.

* * * * *